US012694629B2

(12) United States Patent
Silva et al.

(10) Patent No.: US 12,694,629 B2
(45) Date of Patent: Jul. 28, 2026

(54) GEOSPATIAL CREATOR PLATFORM

(71) Applicant: GOOGLE LLC, Mountain View, CA (US)

(72) Inventors: Stevan Lacerda Muniz Silva, San Jose, CA (US); Michael Jared Finder, Milpitas, CA (US); Scott Wardle, Santa Clara, CA (US); Marc Richards, Cambrige, MA (US)

(73) Assignee: GOOGLE LLC, Mountain View, CA (US)

( * ) Notice: Subject to any disclaimer, the term of this patent is extended or adjusted under 35 U.S.C. 154(b) by 112 days.

(21) Appl. No.: 18/661,434

(22) Filed: May 10, 2024

(65) Prior Publication Data

US 2024/0378824 A1     Nov. 14, 2024

Related U.S. Application Data

(60) Provisional application No. 63/501,241, filed on May 10, 2023.

(51) Int. Cl.
G06T 19/00 (2011.01)
(52) U.S. Cl.
CPC ........ G06T 19/006 (2013.01); G06T 2200/24 (2013.01)
(58) Field of Classification Search
CPC ........................... G06T 19/006; G06T 2200/24
See application file for complete search history.

(56) References Cited

U.S. PATENT DOCUMENTS

| 2016/0133230 | A1* | 5/2016 | Daniels | G06F 3/147 |
| | | | | 345/633 |
| 2019/0057113 | A1* | 2/2019 | McKinnon | G06T 19/003 |
| 2021/0350612 | A1* | 11/2021 | Emami | G01C 21/3632 |

OTHER PUBLICATIONS

ARML 2.0, 2012. Available at: [https://portal.ogc.org/files/?artifact_id=51183] (Year: 2012).*
KML 2.2, 2007. Available at: [https://portal.ogc.org/files/?artifact_id=23689] (Year: 2007).*
He et al.—"Reducing Latency in a Collaborative Augmented Reality Service", 2019. Available at: [https://benswift.me/assets/documents/preprints/he_et_al_2019_reducing_latency_in_a_collaborative_augmented_reality_service.pdf] (Year: 2019).*

* cited by examiner

*Primary Examiner* — Daniel F Hajnik
*Assistant Examiner* — Adeel Bashir
(74) *Attorney, Agent, or Firm* — BRAKE HUGHES BELLERMANN LLP

(57) ABSTRACT

A method including inserting a plurality of images representing a real-world location to a user interface associated with an application configured to generate mixed reality content, associating an anchor with at least one of the plurality of images and associating an object with the anchor.

20 Claims, 12 Drawing Sheets

Inserting a plurality of images representing a real-world location to a user interface associated with an application configured to generate mixed reality content ⟋ S405

Associating an anchor with at least one of the plurality of images ⟋ S410

Associating an object with the anchor ⟋ S415

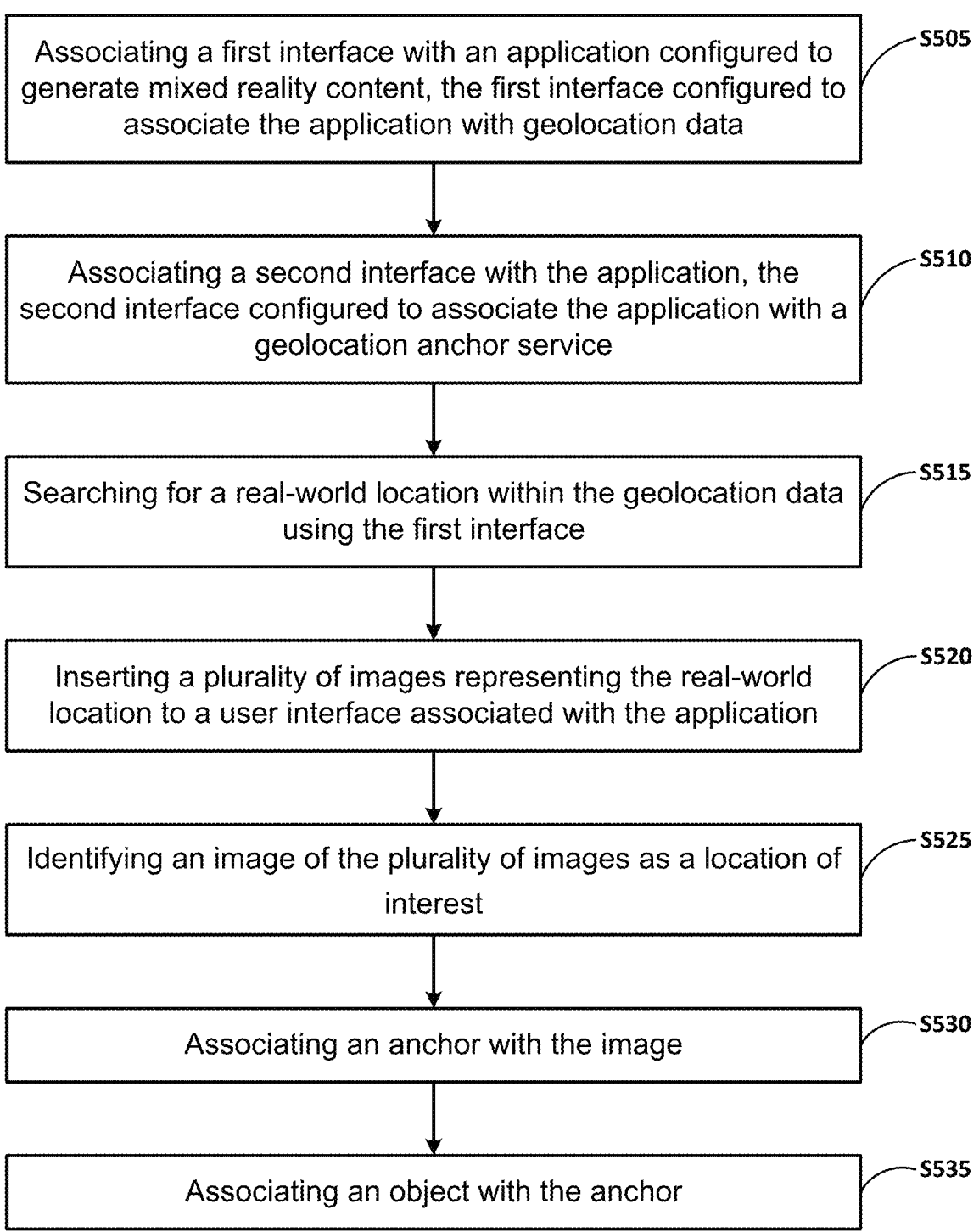

Associating a first interface with an application configured to generate mixed reality content, the first interface configured to associate the application with geolocation data ⟋S505

Associating a second interface with the application, the second interface configured to associate the application with a geolocation anchor service ⟋S510

Searching for a real-world location within the geolocation data using the first interface ⟋S515

Inserting a plurality of images representing the real-world location to a user interface associated with the application ⟋S520

Identifying an image of the plurality of images as a location of interest ⟋S525

Associating an anchor with the image ⟋S530

Associating an object with the anchor ⟋S535

FIG. 5

GEOSPATIAL CREATOR PLATFORM

CROSS REFERENCE TO RELATED APPLICATION

This application claims the benefit of U.S. Provisional Application No. 63/501,241, filed May 10, 2023, the disclosure of which is incorporated herein by reference in its entirety.

BACKGROUND

Users of computing devices (e.g., augmented reality (AR) devices, virtual reality (VR), and/or mixed reality (MR) devices) often interact with content including virtual objects overlayed on a real-world background. The real-world background is sometimes an artificially generated image or video appearing as a real-world background, sometimes and image or video of a real-world location as a real-world background, and sometimes the environment the user is operating in used as the real-world background.

SUMMARY

Implementations described herein make it possible for a developer of virtual content to develop the virtual content from any location. For example, the developer can develop virtual content at a location where users are interacting with the virtual content and develop virtual content at a location remote from the location where users are interacting with the virtual content. This in turn makes developing, for example, a streaming gaming application, or other virtual experience, more flexible because the developer can be anywhere and does not have to travel to a real-world location to develop virtual content. Implementations can include a content developer (or creator) application configured to create geospatial experiences remotely. Geospatial experiences can include, for example, interacting with AR content, VR content, and/or MR content (herein referred to as virtual content) outdoors where real-world environments form the background for the virtual content. The application can be configured to obtain a plurality of images for a given location, and the plurality of images can enable developers to create anchors at a geographic location while the developer is working at a different location. Developer tools (e.g., AR/VR/MR developer software applications) can be configured to allow platforms to stream content associated with any location from any location.

In a general aspect, a device, a system, a non-transitory computer-readable medium (having stored thereon computer executable program code which can be executed on a computer system), and/or a method can perform a process with a method including inserting a plurality of images representing a real-world location to a user in content, associating an application configured to generate mixed reality content, and associating an anchor with at least one of the plurality of images and associating an object with the anchor.

In another general aspect, a device, a system, a non-transitory computer-readable medium (having stored thereon computer executable program code which can be executed on a computer system), and/or a method can perform a process with a method including associating a first interface with an application configured to generate mixed reality content, the first interface is configured to associate the application with geolocation data, associating a second interface with the application, the second interface is configured to associate the application with a geolocation anchor service, searching for a real-world location within the geolocation data using the first interface, inserting a plurality of images representing the real-world location to a user interface associated with the application, identifying an image of the plurality of images as a location of interest, associating an anchor with the image, and associating an object with the anchor.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

FIG. 5 illustrates a block diagram of a method for generating virtual content according to at least one example implementation.

Figure 1A:
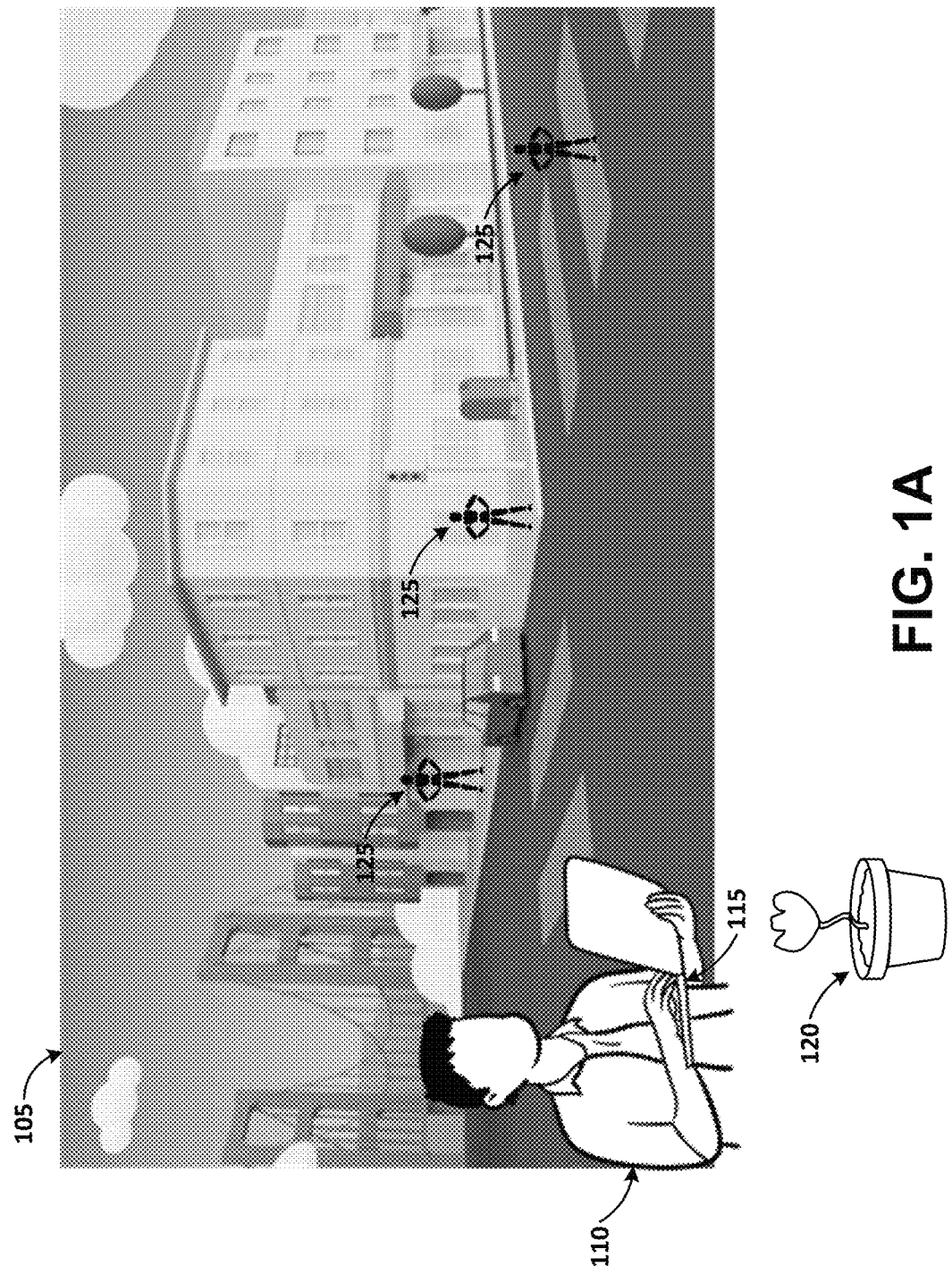
FIG. 1A and FIG. 1B pictorially illustrate a developer creating virtual content.

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

Users of computing devices can experience (e.g., view) virtual content while moving around in a location. For example, a user of a mobile device executing software (e.g., AR/MR/VR software) can view virtual objects overlaid on, for example, landmarks in the real-world environment using the display of the mobile device. The virtual content is typically generated by (and placed by) a developer using a computing device.

When using real-world environments as a background, typically a developer will need to be in the real-world environment. Alternately, or in addition, a developer typically will need to acquire images and/or video at the real-world environment while documenting coordinates (longitude, latitude, altitude, and the like) associated with landmarks or points of interest in the images and/or video at the real-world environment.

To insert virtual content (e.g., AR/MR/VR content), existing technologies enable placing anchors for virtual content at selected landmarks. At least one technical problem with the existing technologies can be the need for developers to be in the real-world environment to live stream the virtual content. At least another technical problem with the existing technologies can be that anchors are limited to being placed on landmarks and/or points of interest.

At least one technical solution to the aforementioned technical problem is that some implementations can use geolocation data (e.g., map data) in a developer tool to acquire a plurality of images (e.g., tiles, or image tiles) representing a real-world location. Using the plurality of images representing a real-world location in the developer tool allows the developer to be at any remote location and generate virtual content for, for example, a live stream game. At least another technical solution to the aforementioned technical problem is that some implementations allow developers, using the developer tool, to create world anchored experiences at a global scale across substantially any location, not just select landmarks and/or points of interest.

At least one technical effect of the aforementioned technical solution is that developers can create virtual content for any real-world environment and place virtual content at any location within the real-world environment or any real-world location. For example, the developer can develop virtual content at a location where users are interacting with the virtual content and develop virtual content at a location remote from the location where users are interacting with the virtual content. This in turn makes developing, for example, a streaming gaming application or other virtual experience more flexible because the developer can be anywhere and does not have to travel in order to develop virtual content.

For example, as geospatial technology capabilities expand, virtual content creators and developers can create geospatial experiences in any real-world location. Creating geospatial experiences can include the use of geospatial services and in order to provide developers overall mapping services. Further, geospatial technologies can include an ecosystem of content that can be indexed and published on mapped real-world locations.

Some implementations can include developer tools configured to create geospatial experiences remotely. The developer tools can be configured to allow platforms to obtain a plurality of images sometimes referred to as three-dimensional (3D) tiles for a given location. The 3D tiles can be used by developers and/or content creators to create experiences. The 3D tiles can be sufficient for developers to create latitude, longitude, altitude and/or earth centered earth fixed (ECEF) anchors. In some implementations, the developer tools can be configured to allow platforms to stream virtual content associated with any location. Accordingly, the developer tools can be configured to allow a developer at a first location to stream virtual content associated with a second location.

In some implementations, the developer creating geospatial experiences remotely can be a developer in a first location and operating a computer including developer tools configured to create geospatial experiences as described herein. At the same time, a user(s) can be in a second location and can be operating a client device configured to interact with geospatial experiences. The first location and the second location can be different geographic locations. For example, if the developer were in the second location, the developer could use a camera associated with the computer including developer tools configured to create geospatial experiences to capture video of a real-world environment (e.g., real-world environment 105 described below) to create geospatial experience. However, the developer is in the first location not the second location. Therefore, in some implementations, the computer including developer tools configured to create geospatial experiences does not have access to a camera that can be used to capture video of the real-world environment associated with the geospatial experience (e.g., the second location).

In other words, in some implementations, the creating of geospatial experiences remotely can includes the developer being in a location outside of a range that a camera is capable of capturing video of the real-world environment associated with the geospatial experience. In other words, the developer does not have access to a camera capable of capturing video of the real-world environment associated with the geospatial experience. In other words, the developer can't see the real-world environment associated with the geospatial experience without using an electronic device such as a camera and/or an electronic communication device. In other words, for example, the developer can't see the real-world environment associated with the geospatial experience with their own eyes. As an example, the real-world environment associated with the geospatial experience can be a geographic location including the Eifel tower. In other words, the user of the client device configured to interact with the geospatial experiences is in Paris France. At the same time, the developer creating the geospatial experiences remotely could be in an office space in New York City. New York City is a geographic location that is remote from Paris France.

For example, referring to FIG. 1A, a plurality of users 125 (e.g., gamers) can be walking in a real-world environment 105 with user devices configured to interact with virtual content. In the implementations described herein, virtual content can be augmented reality (AR) content. In the implementations described herein, virtual content can be virtual reality (VR) content. In the implementations described herein, virtual content can be mixed reality (MR) content. In the implementations described herein, virtual content can be AR content. In the implementations described herein, virtual content can be virtual reality VR content, MR content and/or AR content.

A developer 110 (e.g., game developer) can be streaming virtual content (e.g., streaming a game) for the plurality of users 125 to interact with. Developer 110 can use computer 115 to insert virtual content into real-world environment 105. For example, developer 110 can use computer 115 to insert virtual object 120 into real-world environment 105 and the plurality of users 125 can interact with virtual object 120 using their devices. In some implementations, computer 115 can be configured to insert virtual object 120 into real-world environment 105 if developer 110 is in (or proximate to, co-located, etc.) real-world environment 105 and if developer 110 is not in (or proximate to, co-located, etc.) real-world environment 105. In other words, in some implementations developer 110 can generate streaming virtual content locally and remotely using computer 115 with example developer tools installed thereon.

Figure 1B:
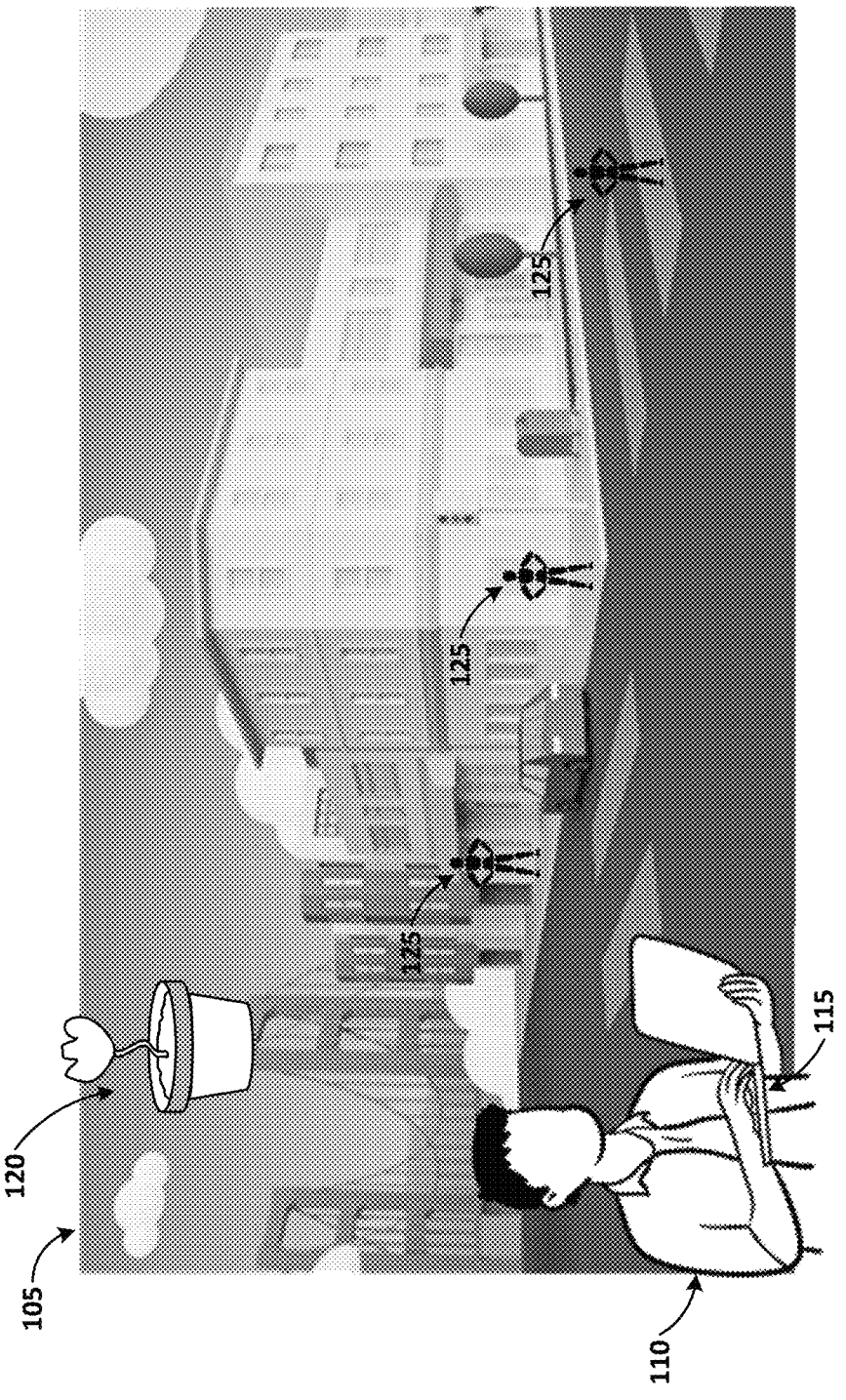

As mentioned above, the at least one technical problem is that developer 110 can use computer 115 to insert virtual object 120 into real-world environment 105 if developer 110 is in (or proximate to, co-located, etc.) real-world environment 105 while streaming the virtual content. In other words, referring to FIG. 1B, a camera of computer 115 can be configured to capture images of the location that the developer is going to insert virtual object 120 while streaming the virtual content. However, referring to FIGS. 1C and 1D, developer 110 can also use computer 115 to insert virtual object 120 into real-world environment 105 if developer 110 is not proximate to real-world environment 105.

Streaming can be communicating content from a first device to at least one second device via the internet. Streaming generally refers to communicating stored content. By contrast, live streaming can be the streaming of content in real time or near real time. The content can include a video, a movie, a television show, audio, virtual content and the like. Virtual content can be streamed and/or live streamed. Streaming virtual content can include communicating stored (or previously recorded) virtual content from a first device to at least one second device via the internet. Live streaming virtual content can include communicating virtual content from a first device to at least one second device via the internet in real time or near real time.

Figure 1C:
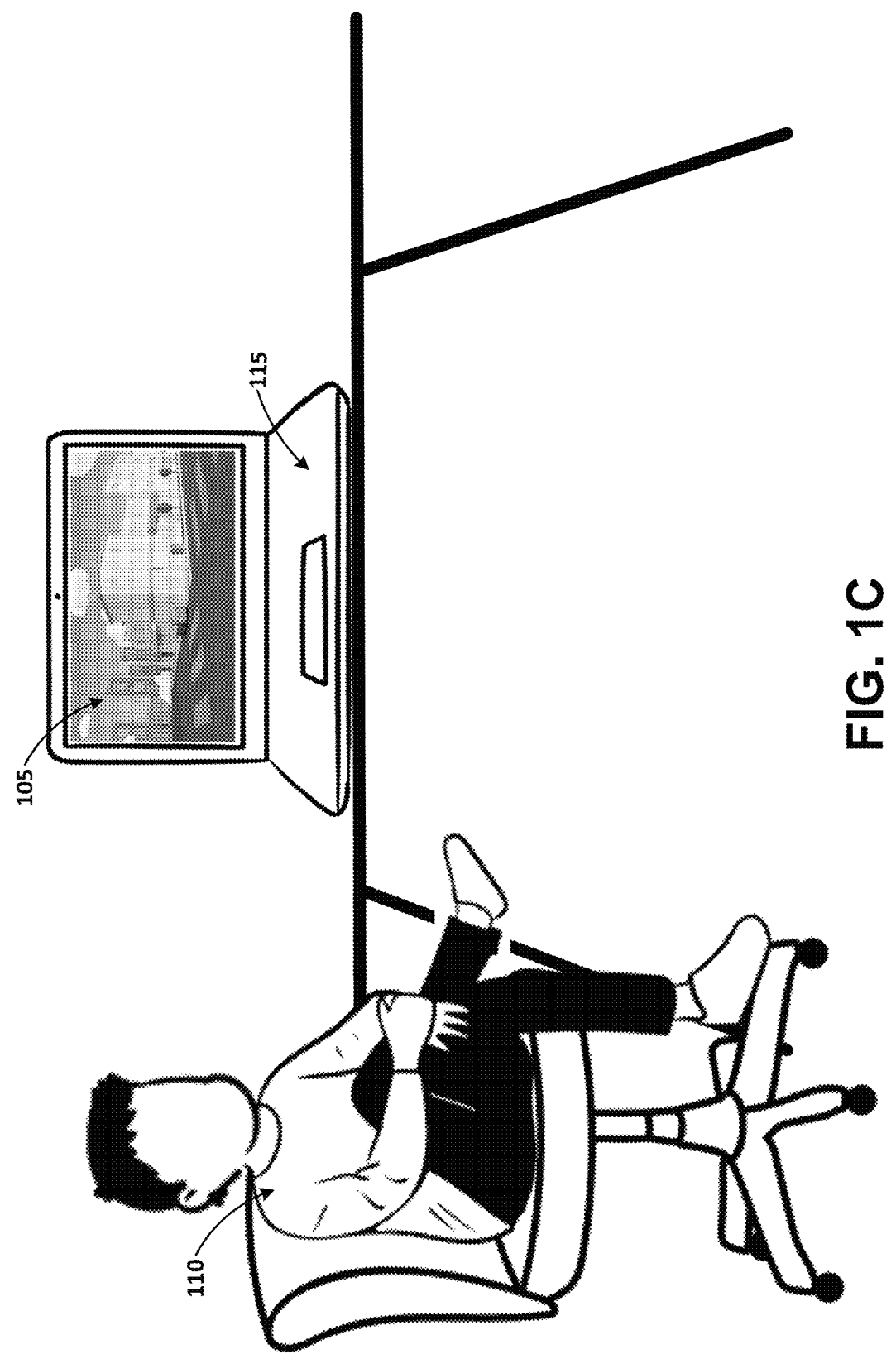
FIG. 1C and FIG. 1D pictorially illustrate a developer creating virtual content according to at least one example implementation.

Referring to FIG. 1C, developer 110 can use computer 115 to insert virtual content into real-world environment 105. However, to solve the aforementioned problem, in some implementations developer 110 can be in a remote location (e.g., in an office) operating a user interface associated with an application configured to generate virtual content (e.g., a developer tool). A plurality of images (e.g., 3D tiles) representing the real-world environment 105 as a real-world location can be inserted in the application.

Figure 1D:
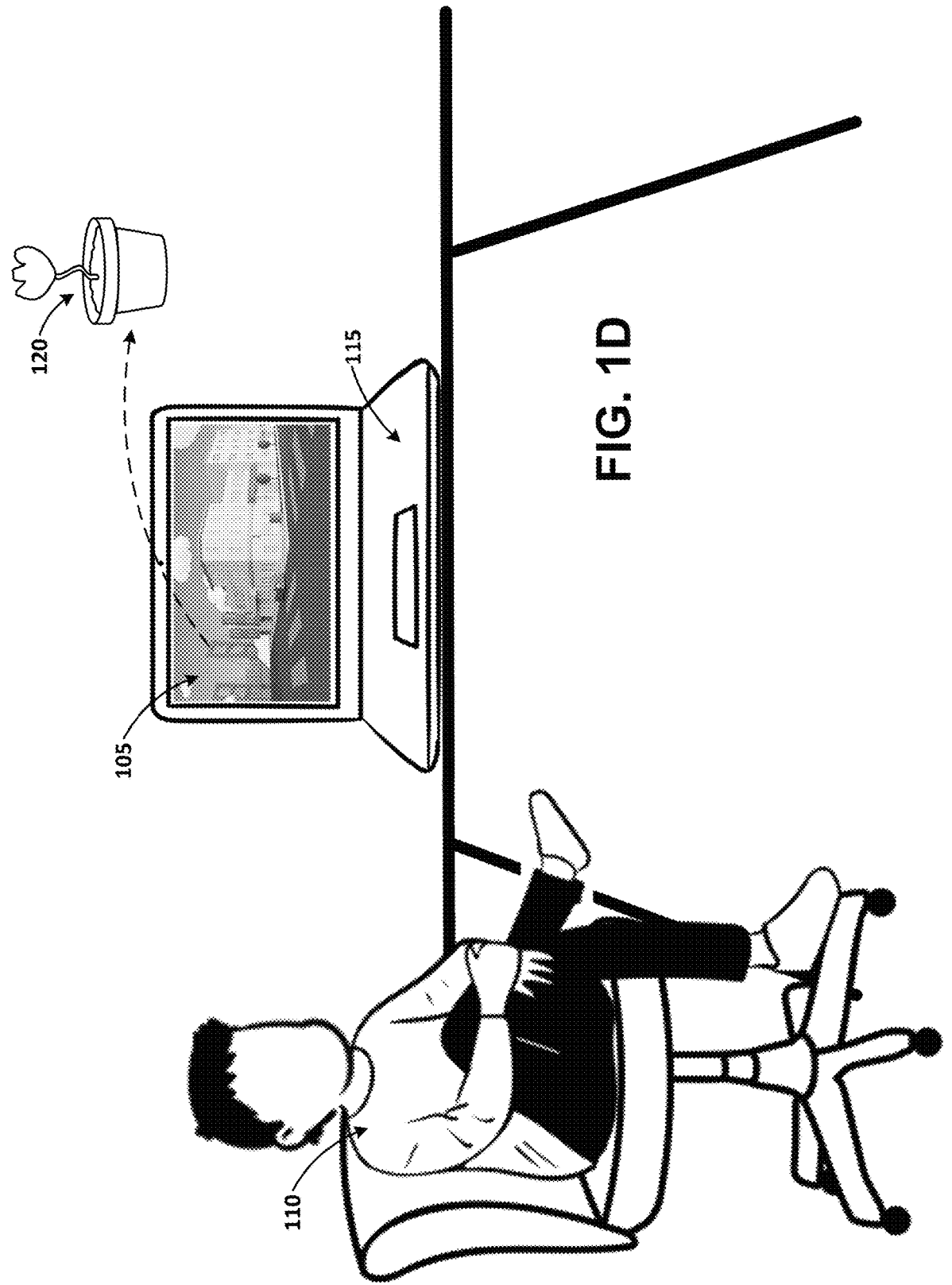

In some implementations, referring to FIG. 1D, the developer 110 can use the user interface (as a developer tool operating on computer 115) to add an anchor 130 at any location of the plurality of images (e.g., 3D tiles) representing the real-world environment 105. Then the virtual object 120 can be associated with anchor 130. As mentioned above, developer 110 (e.g., game developer) can be streaming virtual content (e.g., streaming a game) for the plurality of users 125 to interact with. In some implementations, developer 110 can use computer 115 while at a remote location to insert virtual object 120 into real-world environment 105 and the plurality of users 125 can interact with virtual object 120 using their devices.

In some implementations, an application (e.g., a developer application, a client application, an AR/MR/VR developer application, an AR/MR/VR client application, and/or the like) can be configured to detect a set of visual feature points from an image and/or image data. The application can be configured to track the movement of the set of visual feature points over time. In some implementations, the set of visual feature points can be a plurality of points (e.g., interesting points) that represent the user's environment. Feature points can be repositioned frequently (e.g., a movable object like an automobile) or infrequently (e.g., a fixed object like a window on a building that is moved in construction). Therefore, in some implementations, the set of visual feature points may be updated over time.

For example, an identified visual feature point can be associated with a city bus moving from bus stop to bus stop. Therefore, this feature point can be updated frequently. For example, an identified visual feature point can be associated with a sign on a city building. Therefore, this feature point can be updated infrequently (e.g., in response to detecting a change in content and/or location).

In some implementations, the set of visual feature points when stored in a memory of a system for generating virtual content can be referred to as an anchor (e.g., a virtual anchor). Accordingly, an anchor and a feature point can be used interchangeably.

In some implementations, an anchor can be a data structure that corresponds to a feature in the real-world. The anchor can be used for placement and/or retrieval of a virtual object associated with the anchor. The data structure can be stored in a memory associated with virtual content. The data structure can include an identification of the anchor, a location of the anchor (e.g., geolocation, a 3D tile identification, and the like), a type of anchor, an associated object and the like.

In some implementations, the anchor(s) can be referred to as persistent anchor(s). In some implementations, persistent anchor(s) can correspond to locations in a real-world location that change infrequently. In some implementations, the anchor(s) and/or persistent anchor(s) can be stored in memory as a data structure, datastore, database and/or the like. In some implementations, the anchor(s) and/or persistent anchor(s) can be stored in a memory associated with geolocation anchor service 340 (described below). In some implementations, the anchor(s) and/or persistent anchor(s) can be associated with virtual content.

In some implementations, a mobile client can be configured to help users 125 to experience geospatial elements seamlessly via a mobile operating system. In some implementations, the mobile client can be configured to provide terrain anchors configured to show anchors and/or experiences respecting the terrain (e.g., no need to guestimate and/or calculate altitude). In some implementations, the mobile client can be configured to provide facades including, for example, surfaces facade geometry after localization takes place to enable occlusion or inpainting effects. In some implementations, the mobile client can be configured to provide hybrid depth to allow users to obtain a broader depth map.

An application interface (API) can be a software interface used for sharing functionality between two applications, software programs, and/or systems. An API can define methods, rules and protocols that describe how the applications, software programs, and/or systems communicate with each other. For example, a first application can be configured to use anchors and a second application can be configured to generate anchors. Therefore, the second application can include a class method for creating an anchor, updating the anchor and/or modifying the anchor. The class method for creating an anchor can be configured to generate an anchor data structure, assign a unique identification to the anchor and associate a location with the anchor. Further, the class method for updating and/or modifying the anchor can be configured to associate virtual content with the anchor. Therefore, in some implementations, the API can be configured to provide the first application access to the class method for creating an anchor, the class method for updating and/or modifying the anchor, and the like.

In some implementations, a viewer service or API and/or live view service or API can be configured to allow the plurality of users 125 to interact with virtual content. For example, the viewer service and/or live view service can use the same source for pose as developer tools use. However, the pose of an experience can change and be published slowly. Therefore, the viewer service can be configured to request the latest pose of an experience frequently.

In some implementations, at least one of the plurality of users 125 can be operating a VR device. In some implementations, at least one of the plurality of users 125 can be operating an AR device. In some implementations, at least one of the plurality of users 125 can be operating a MR device. An AR device includes a pass-through display. A VR device does not include a pass-through display. A MR device can include one or both a pass-through display and a non-pass-through display. A pass-through display can be a display with a translucent portion allowing a user to see the real-world environment. A non-pass-through display can be a display without a translucent portion and a user views the real-world environment via an image. The image can be captured by a front facing camera and/or an image retrieved from geolocation data (e.g., geolocation data 345).

For example, a live stream (e.g., a game) can be streamed and interacted with by a user of a VR device and a user of an AR device. The user of the AR device can be physically located at the real-world location whereas the user of the VR device can be physically located anywhere. The user of the AR device can view the real-world environment through the display of the AR device. The user of the VR device can view the real-world environment on the display of the VR device as images generated using 3D tiles associated with the real-world location.

Figure 2A:
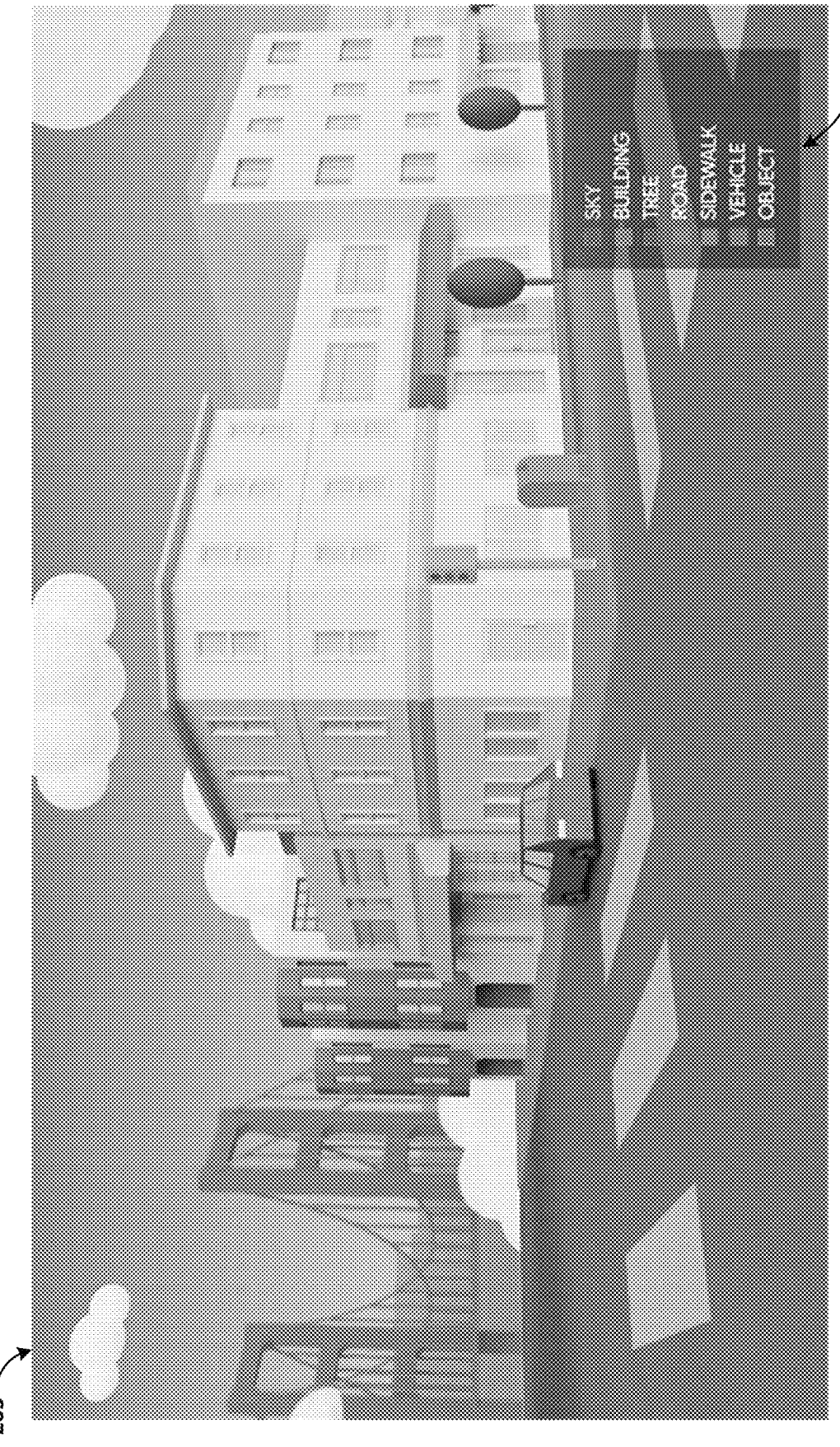
FIG. 2A, FIG. 2B, FIG. 2C, FIG. 2D, and FIG. 2E pictorially illustrate steps for creating virtual content according to at least one example implementation.

FIGS. 2A to 2E pictorially illustrate steps for creating virtual content according to at least one example implementation. In FIG. 2A, a developer (e.g., developer 110) can use an application (e.g., developer tool) including a user interface (UI) to identify a real-world location 205. For example, the developer can search for a location using the UI. The developer can search for a location name, a point of interest, an address, a latitude and longitude, and the like using a search tool associated with the application. When a location is identified, an image representing real-world location 205 can be downloaded. In some implementations, the image representing real-world location 205 can include a legend 210 identifying items of interest in the image representing real-world location 205. In some implementations the image representing real-world location 205 can be partitioned into a plurality of images representing real-world location 205. In some implementations, the plurality of images representing real-world location 205 can be referred to as 3D tiles for a location.

Figure 2B:
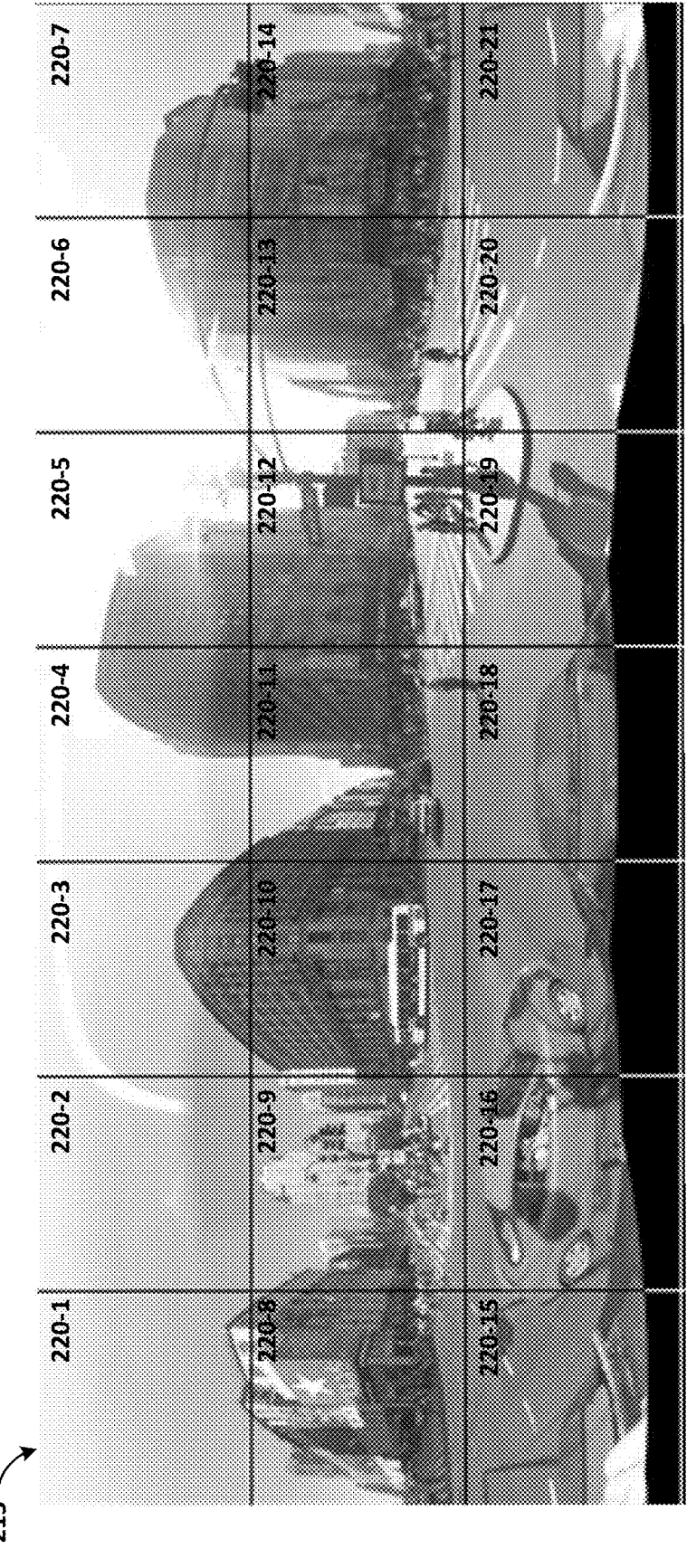

For example, referring to FIG. 2B, an image representing real-world location 215 (different than real-world location 205 for illustrative purposes) can be partitioned into a plurality of images 220-1, 220-2, 220-3, 220-4, 220-5, 220-6, 220-7, 220-8, 220-9, 220-10, 220-11, 220-12, 220-13, 220-14, 220-15, 220-16, 220-17, 220-18, 220-19, 220-20, and 220-21. The plurality of images 220-1 to 220-21 can be referred to as 3D tiles for a location. Each of the plurality of images 220-1 to 220-21 can include landmarks, points of interest and other locations having a longitude, latitude, and/or altitude. Points of interest can have tops, bottoms, facades, and the like. For example, a building can have a roof, an entrance, an overhang, a canopy, a window, and the like. For example, a tree can have a top and a root. For example, a post can have a top, a bottom, a light, a sign, and/or the like. In some implementations, a point of interest can be permanent (e.g., a building) or temporary (e.g., an automobile).

Figure 2C:
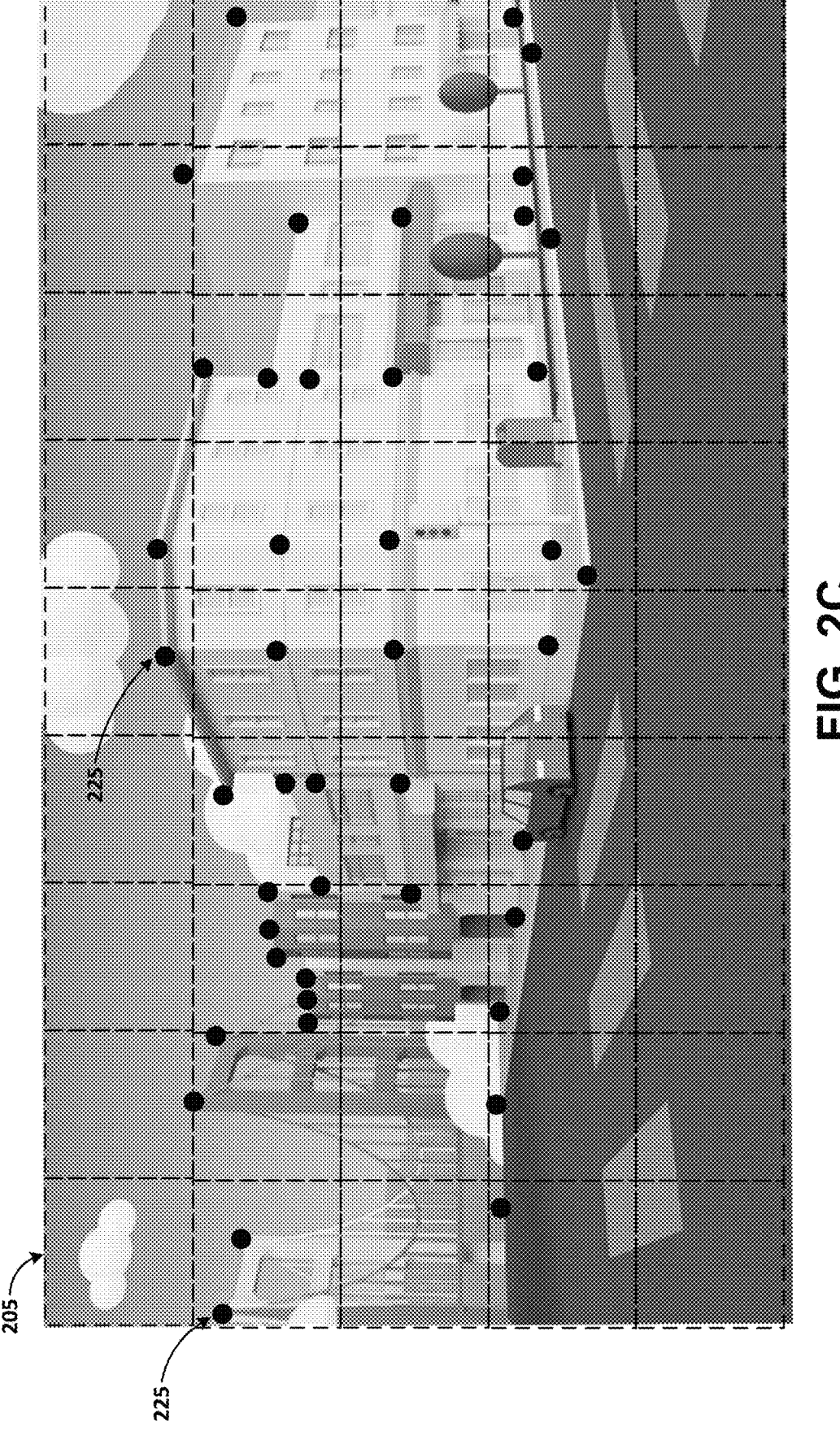
Figure 2D:
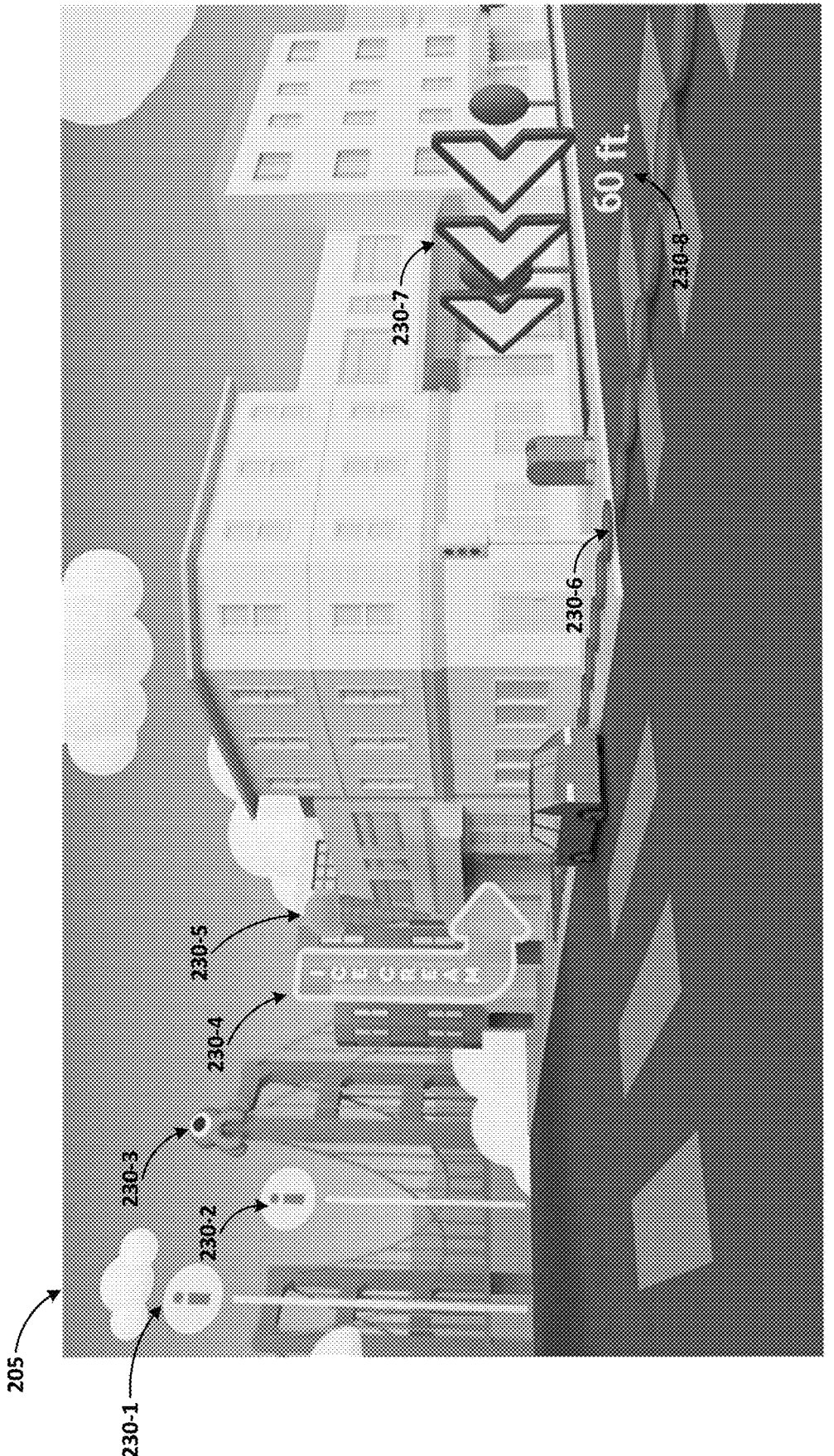
Figure 2E:
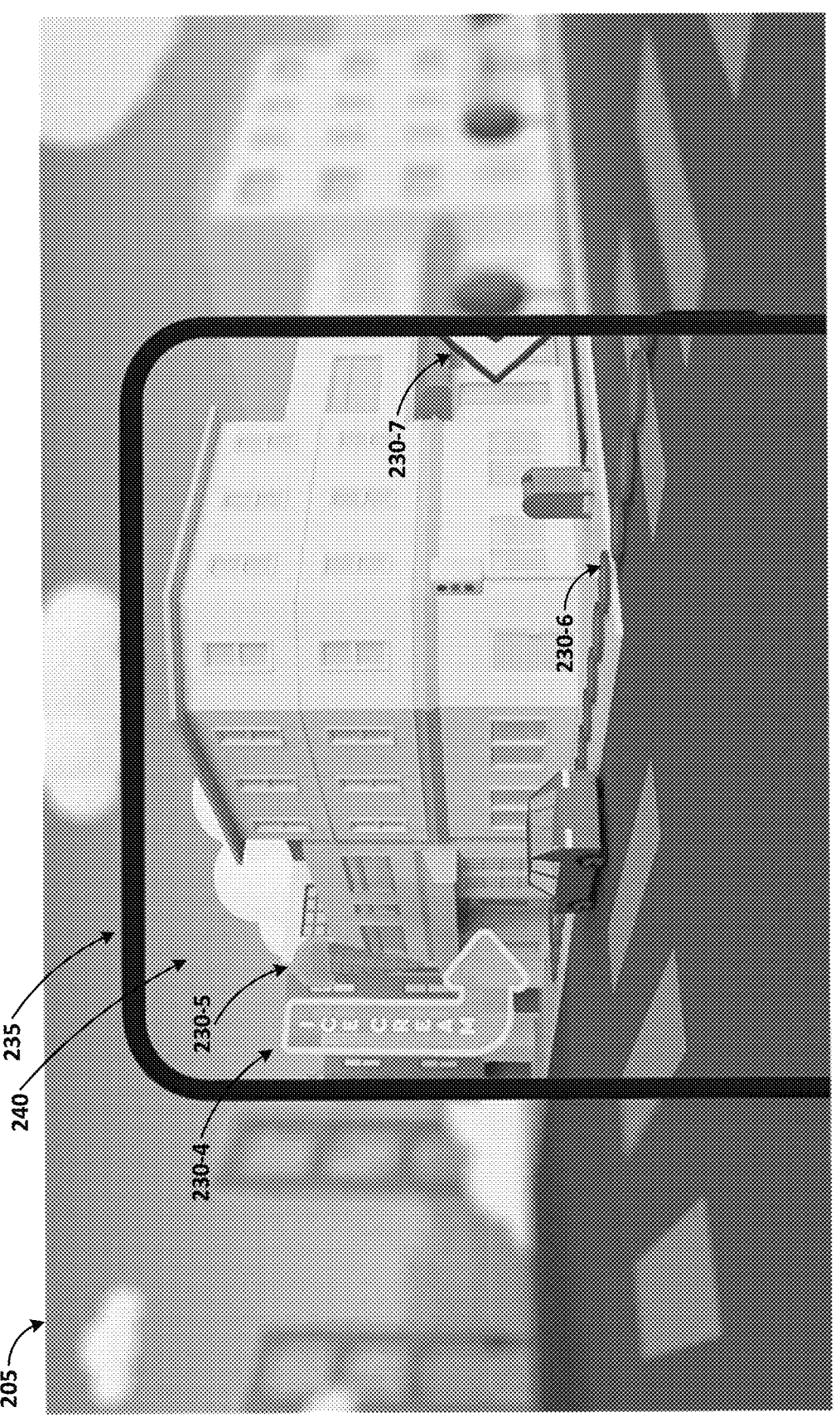

In some implementations, referring to FIG. 2C, the image representing real-world location 205 (now shown with a plurality of images, tiles, 3D tiles, and the like) can include a plurality of anchors 225 (illustrated as circles on the image and not all anchors are labeled). The anchors (e.g., world anchors or cloud anchors) can be added to the image representing real-world location 205 by the developer using the UI. In some implementations, an anchor can be associated with one of the plurality of images. In some implementations, an anchor can be associated with a landmark, point of interest and other location having a longitude, latitude, and/or altitude. In some implementations, the anchor can be a persistent anchor. A persistent anchor can be associated with a geolocation on a permanent (e.g., a substantially permanent) basis. In some implementations, a persistent anchor can be defined at a fixed location (e.g., associated with an object that does not frequently move (e.g., a car)). A persistent anchor can be associated with the landmark, point of interest and other location having a longitude, latitude, and/or altitude on a substantially permanent basis. Therefore, in some implementations, a landmark and its associated virtual object can be viewed as an element of virtual content long after the landmark and its associated virtual object are created.

For example, in some implementations, a first developer can place a persistent application in the virtual content being created by the first developer. However, the persistent application placed by the first developer can be used by a second developer in different virtual content being created by the second developer.

For example, virtual content that is live streamed can generate a plurality of landmarks and associate VR content with the landmarks. After the live stream has ended, a landmark and its associated virtual object can be stored on, for example, a server associated with a system or platform (e.g., an AR/MR/VR system or platform). Then at some future time, in some implementations, a user viewing virtual content at the real-world location (e.g., real-world location 205) including the landmark and its associated virtual object can view the virtual object at the location of the landmark.

Figure 3:
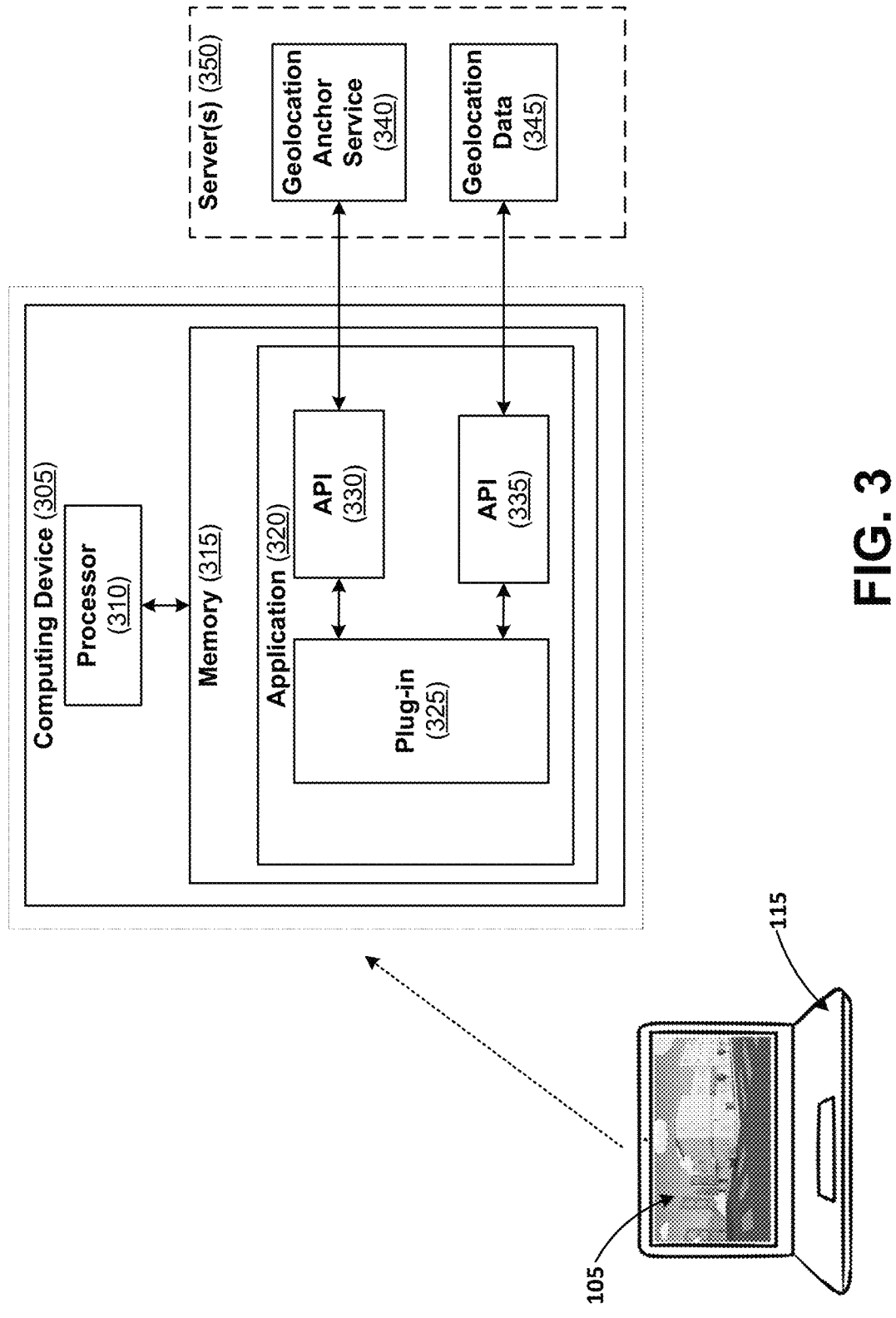
FIG. 3 is a block diagram of an AR/MR/VR system (or platform) according to at least one example implementation.

FIG. 3 is a block diagram of a system or platform (e.g., an AR/MR/VR system or platform) according to an example implementation. The system (or platform) of FIG. 3 can include, can be an element of, and/or can be developer tools configured to create geospatial experiences remotely. The developer tools can be configured to allow platforms to obtain a plurality of images sometimes referred to as 3D tiles for a given location. The 3D tiles can be used by developers and/or content creators to create experiences. The 3D tiles can be sufficient for developers to create latitude, longitude, altitude and/or earth centered earth fixed (ECEF) anchors. Accordingly, the developer tools can be configured to allow systems and/or platforms to stream virtual content associated with any location. Accordingly, the developer tools can be configured to allow a developer at a location to develop virtual content for and/or stream (e.g., live stream) virtual content associated with another location. In other words, the system (or platform) of FIG. 3 can allow users (e.g., of an AR/MR/VR enabled computing device) to interact with virtual content at a real-world location that is generated by a developer (or creator) at a different location than the user location.

As shown in FIG. 3, the system includes a computing device 305 and a server(s) 350. The computing device 305 can be a computing device used by a developer to create virtual content. For example, the developer can be developer 110 and the computing device 305 can be computer 115 when used by developer 110. For example, in some implementations, the system including computing device 305 and a server(s) 350 can be used by developer 110 (e.g., game developer) to develop streaming virtual content (e.g., streaming a game) for the plurality of users 125 to interact with. In some implementations, developer 110 can use computing device 305 to develop the streaming virtual content while at a remote location to insert virtual objects (e.g., virtual object 120) into a real-world environment (e.g., real-world environment 105) and/or real-world location (e.g., real-world location 205).

As shown in FIG. 3, the computing device 305 includes a processor 310 (e.g., at least one processor) and a memory 315 (e.g., at least one memory, a non-transitory computer-readable storage medium, and the like). Memory 315 includes an application 320 including a plug-in 325, an API 330, and an API 335. Server 350 includes a geolocation anchor service 340 and a geolocation data 345. Computing device 305 and server(s) 350 can be remote from each other and can interact through a wired and/or wireless communication network.

In some implementations, application 320 can be configured to generate virtual reality (VR) content. In some implementations, application 320 can be configured to generate augmented reality (AR) content. In some implementations, application 320 can be configured to generate mixed reality (MR) content. In some implementations, application 320 can be configured to generate virtual content. In some implementations, generating virtual content can be referred to as generating mixed reality content and/or MR content.

Application 320 can include plug-in 325. Plug-in 325 can be a computer programming tool that can be added to, installed in, installed with, an element of, and/or the like any virtual content creation software. For example, application 320 can be a cross-platform gaming engine or development tool and plug-in 325 can be added to the cross-platform gaming engine or development tool enabling a developer and/or content creator to use the features described in this disclosure. For example, application 320 can be an AR/MR/VR authoring, developing, and publishing tool and plug-in 325 can be added to the AR/MR/VR authoring, developing, and publishing tool enabling a developer and/or content creator to use the features described in this disclosure. In some implementations, the application 320 can include a user interface (UI). The UI can include a search tool, an anchor tool, a 3D tile tool, and the like.

Server 350 can include, at least, geolocation anchor service 340 and geolocation data 345. In some implementations, geolocation anchor service 340 can be configured to store (e.g., in a memory, a data structure, a database, and/or the like) a set of visual feature points referred to herein as an anchor. For example, the anchor can be used to localize an AR environment for a secondary user (e.g., user's 125) of an AR/MR/VR session (e.g., a streaming game). In some implementations, an anchor can be used to compare and match against other anchors identified by a secondary user's computing device to determine whether the real-world environment is the same as the physical space of stored anchors and to calculate the location of the secondary user's computing device within the real-world environment.

In some implementations, virtual content can be associated with an anchor. The virtual content can include an object or virtual object (e.g., 3D objects), annotations, balloons, and/or other information. For example, a developer or content creator can associate a game character with the corner of a street or annotate a street sign with information about businesses on the street. Motion tracking means that you can move around and view these objects from any angle, and even if a user turns around and/or leaves the location (e.g., street), when the user returns, the game character or annotation will be there in the same location.

In some implementations, developer tools can be configured to create persistent anchors that can be integrated with the 3D tiles. The persistent anchors can be configured to allow content to be anchored to a space (e.g., associated with a 3D tile) instead of latitude, longitude, and/or altitude that may change. The persistent anchoring can be configured to be aligned to 3D tiles that are streamed.

In some implementations, geolocation anchor service 340 can be configured to generate an anchor that corresponds to a latitude, longitude, and altitude of a geolocation. In some implementations, geolocation anchor service 340 can be configured to generate an anchor that corresponds to a terrain at the geolocation. In some implementations, geolocation anchor service 340 can be configured to generate an anchor that corresponds to an elevation (or façade, rooftop, and the like) at the geolocation. In some implementations, geolocation anchor service 340 can be configured to generate an anchor that corresponds to a 3D tile of a geolocation. In some implementations, geolocation anchor service 340 can be configured to generate an anchor that corresponds to a location, façade, rooftop, altitude, and the like within a 3D tile of a geolocation.

In some implementations, terrain data and façade data can be used to generate an anchor. For example, terrain data and façade data can be used to verify the correctness of an anchor. In some implementations, geolocation anchor service 340 can include a persistent anchoring service configured to allow developers to provide a latitude, longitude, and/or altitude terrain offset and obtain a response with anchor ids based on a creation time. In some implementations, a service (e.g., façade service or façade API) can be configured to allow systems or platforms to stream facade data and expose facade data on 3D tiles and street view experiences.

In some implementations, a user (e.g., users 125) device or client device configured to interact with virtual content can be configured to provide a persistent anchor resolve function to allow clients to resolve and display anchor localization based on persistent anchor identification and user session, user pose, and/or user location. In some implementations, the user device can be configured to provide on device semantics to expose semantics in real time based on a plurality of labels for a given scene in outdoor settings. In some implementations, the mobile client can be configured to provide a persistent anchor create function to allow clients to create persistent anchors based on a user's location, session, and/or the like. In other words, a user (e.g., users 125) device can be configured to insert a persistent anchor and virtual content to, for example, a live streamed game that the user device is interacting with.

Geolocation data 345 can include map data. The map data can be associated with a geographic location. The map data can be less detailed (e.g., satellite data), semi-detailed (e.g., road maps, terrain, and the like), detailed (e.g., street level), and/or the like. In some implementations, developer tools can be configured to allow systems or platforms to obtain a plurality of images sometimes referred to as 3D tiles for a given location. In some implementations, 3D tiles can be associated with detailed map data.

In some implementations, 3D tiles can be similar to two-dimensional (2D) tiles (or 2D images) except that 3D tiles contain panoramic imagery taken at street level. 3D tiles can be used to explore world landmarks, see natural wonders, and step inside places such as museums, arenas, restaurants, or small businesses. Geolocation data 345 via API 335 can be configured to enable access to detailed or street level 3D tiles, street level metadata, street level thumbnail images, and the like. Developers can use geolocation data 345 via API 335 stitch together image tiles taken from the street level to create a real-life panoramic view of real-world locations. In some implementations, searching and querying a location can return a plurality (e.g., 10, 50, 100, 200, and the like) images representing a real-world location. In some implementations, each image can have a unique identification. In some implementations, the plurality of images representing a real-world location can have a unique identification. In some implementations, the plurality of images representing a real-world location can have metadata about each image and/or each location (e.g., group of images). The metadata can include tile height, tile width, latitude, longitude, tilt, roll, image type, address, and/or the like.

Accordingly, some implementations can include developer tools configured to allow systems and/or platforms to stream a live view service based on a given location aligned to a 3D tile(s) based on detailed map data (sometimes called a street view). The live view service can be configured to provide the pose and orientation of the experience, so a user of the service (e.g., developer or creator) can place an anchor anywhere relative to the user location. At the same time, the developer can manage rendering an overlay for feedback. The live view service can be configured to synchronize 3D content outside of a live view renderer (e.g., the service can be configured to share the rendering context). For example, a custom render stage can be configured to allow adding 3D content in sync with the experience.

In some implementations, services associated with geolocation anchor service 340 can be linked to the plug-in 325 via API 330. In some implementations, services associated with geolocation data 345 can be linked to the plug-in 325 via API 335. An application programming interface or API can be configured to provide a mechanism for two or more computer programs or components to communicate. Geolocation anchor service 340 can include computer programs or components sometimes referred to as libraries, classes, and/or class methods for creating, deleting, updating, modifying, and the like anchors. For example, geolocation anchor service 340 can include a class method for creating an anchor and a class method for associating an object, an annotation, and the like with the anchor. In some implementations, an anchor can include a data structure including an identification of the anchor, a location of the anchor (e.g., geolocation, a 3D tile identification, and the like), a type of anchor, an associated object and the like. Therefore, the class method for creating an anchor can be configured to generate an anchor data structure, assign a unique identification to the anchor and associate a location with the anchor. Further, the class method for updating and/or modifying the anchor can be configured to associate virtual content with the anchor. Therefore, in some implementations, API 330 can be configured to provide access to the class method for creating an anchor, the class method for updating, and/or modifying the anchor, and the like.

In some implementations, geolocation data 345 can include a plurality of images representing a real-world location (or 3D tiles) and computer programs or components sometimes referred to as libraries, classes, and/or class methods for accessing the plurality of images. For example, the class method for accessing the plurality of images can include a location search tool, an image(s) retrieve tool, and the like. Therefore, the class method for location search can include a location input function and a location return function. The location input function can be configured to take a location name, a point of interest, an address, a latitude and longitude, and the like as input. The location return function can be configured to return information about a location (e.g., an image, a location identification, a location legend (e.g., legend 210), and the like. The class method for image(s) retrieve can return a plurality of images representing a real-world location based on, for example, a location identification, a number of images, a range (e.g., in meters or feet from a center), and/or the like.

In some implementations, content and sharing (or syndication and licensing) can be configured to provide developers and content creators' tools configured to publish their content. In some implementations, enabling content and sharing can consider use of a format, for example, 3D file formats such as GLEF, GLTF, USDZ, and the like. The format may or may not be standardized across all platforms. The format can be based on the capabilities needed to publish content. Enabling content and sharing can consider data standardization. For example, data may or may not be included with the asset for indexing purposes. For example, schemas can be established for 3D assets.

In some implementations, enabling content and sharing can consider how moderation should take place. For example, 3D assets can be different from photos or videos. For example, moderators can be used to render and/or review assets and answer questions regarding those assets. Moderator functions can vary based on platform moderation tools.

In some implementations, enabling content and sharing can consider permission and/or licensing. For example, a developer and/or content creator can be granted permission to publish their content. For example, a developer and/or content creator can be granted permission for a period of time. In some implementations, enabling content and sharing can consider attribution. For example, can attribution be to the creator and/or developer and/or the platform that was used.

Figure 4:
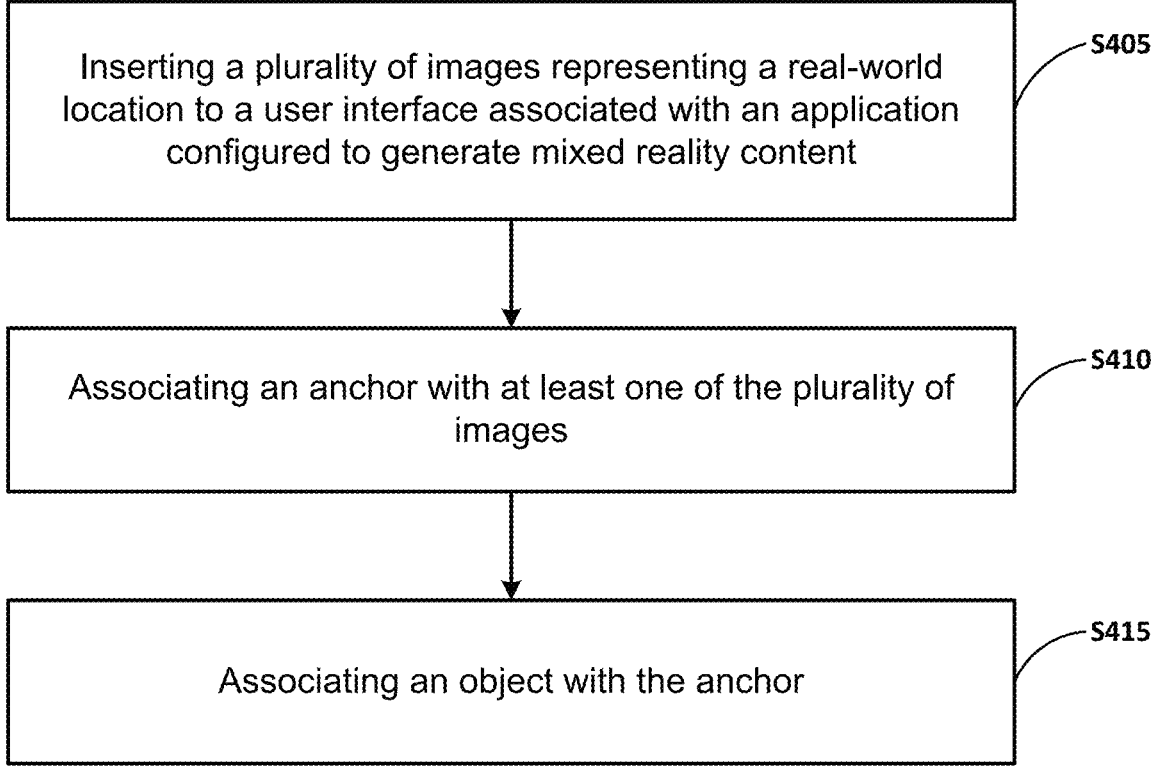
FIG. 4 illustrates a block diagram of a method for generating virtual content according to at least one example implementation.

Example 1. FIG. 4 is a block diagram of a method for generating virtual content according to an example implementation. As shown in FIG. 4, in step S405 inserting a plurality of images representing a real-world location to a user interface associated with an application configured to generate mixed reality content. In step S410 associating an anchor with at least one of the plurality of images. In step S415 associating an object with the anchor.

Example 2. The method of Example 1 can further include prior to inserting the plurality of images, associating an interface with the application, the interface configured to associate the application with geolocation data, searching for the real-world location within the geolocation data using the interface, and in response to the searching for the real-world location, receiving at least one of an identification associated with the real-world location and an identification associated with the plurality of images.

Example 3. The method of Example 1 can further include prior to associating the anchor, associating an interface with the application, the interface configured to associate the application with a geolocation anchor service, identifying a location within the real-world location to place the anchor, and identifying the image of the plurality of images based on the location.

Example 4. The method of Example 3 can further include generating a data structure representing the anchor, the data structure including at least one of an identification of the location, an identification of a tile, a type of anchor, and an identification of the object.

Example 5. The method of Example 1, wherein the anchor can be a persistent anchor and the persistent anchor can be associated with a geolocation.

Example 6. The method of Example 1, wherein the anchor can be one of a first anchor corresponding to a latitude, longitude, and altitude of a geolocation, a second anchor corresponding to a terrain at the geolocation, or a third anchor corresponding to an elevation at the geolocation.

Example 7. The method of Example 1 can further include generating the mixed reality content based on the anchor and the object and streaming the mixed reality content.

Example 8. The method of Example 1, wherein the anchor can be a first anchor and the object can be a first object, the method can further include displaying a second object on the user interface in one of the plurality of images based on a second anchor, the second anchor and the second object being generated by a device interacting with the mixed reality content.

Example 9. FIG. 5 is a block diagram of a method for generating virtual content according to an example implementation. As shown in FIG. 5, in step S505 associating a first interface with an application configured to generate mixed reality content, the first interface is configured to associate the application with geolocation data. In step S510 associating a second interface with the application, the second interface is configured to associate the application with a geolocation anchor service. In step S515 searching for a real-world location within the geolocation data using the first interface. In step S520 inserting a plurality of images representing the real-world location to a user interface associated with the application. In step S525 identifying an image of the plurality of images as a location of interest. In step S530 associating an anchor with the image. In step S535 associating an object with the anchor.

Example 10. The method of Example 9 can further include in response to the searching for the real-world location, receiving at least one of an identification associated with the real-world location and an identification associated with the plurality of images.

Example 11. The method of Example 9, wherein the anchor can be a first anchor and the object can be a first object, the method can further include displaying a second object on the user interface in one of the plurality of images based on a second anchor, the second anchor and the second object being generated by a device interacting with the mixed reality content.

Example 12. The method of Example 9, wherein the anchor can be a persistent anchor.

Example 13. A method can include any combination of one or more of Example 1 to Example 12.

Example 14. A non-transitory computer-readable storage medium comprising instructions stored thereon that, when executed by at least one processor, are configured to cause a computing system to perform the method of any of Examples 1-13.

Example 15. An apparatus comprising means for performing the method of any of Examples 1-13.

Example 16. An apparatus comprising at least one processor and at least one memory including computer program code, the at least one memory and the computer program code configured to, with the at least one processor, cause the apparatus at least to perform the method of any of Examples 1-13.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

What is claimed is:

1. A method comprising:

inserting a plurality of images representing a real-world location to a user interface associated with an application configured to generate mixed reality content operating on a first device;

associating an anchor with an image of the plurality of images, the anchor is derived from a data structure including geospatial data defining a position in space independent of sensor data associated with a second device that is in the real-world location, the data structure including a plurality of tiles representing the plurality of images, the plurality of tiles are tiered and include multiple resolutions, and the anchor is in a fixed position within the plurality of tiles and independent of the sensor data associated with the second device; and associating an object with the anchor, the anchor defining an origin for the object.

2. The method of claim 1, further comprising:

prior to inserting the plurality of images:

associating an interface with the application, the interface configured to associate the application with geolocation data;

searching for the real-world location within the geolocation data using the interface; and in response to the searching for the real-world location, receiving at least one of an identification associated with the real-world location and an identification associated with the plurality of images.

3. The method of claim 1, further comprising:

prior to associating the anchor:

associating an interface with the application, the interface configured to associate the application with a geolocation anchor service;

identifying a location within the real-world location to place the anchor; and identifying the image of the plurality of images based on the location.

4. The method of claim 3, further comprising generating a data structure representing the anchor, the data structure including at least one of an identification of the location, an identification of a tile, a type of anchor, and an identification of the object.

5. The method of claim 1, wherein the anchor is a persistent anchor, and the persistent anchor is associated with a geolocation.

6. The method of claim 1, wherein the anchor is one of a first anchor corresponding to a latitude, longitude, and altitude of a geolocation, a second anchor corresponding to a terrain at the geolocation, or a third anchor corresponding to an elevation at the geolocation.

7. The method of claim 1, further comprising:

generating the mixed reality content based on the anchor and the object; and streaming the mixed reality content.

8. The method of claim 1, wherein the anchor is a first anchor and the object is a first object, the method further comprising:

displaying a second object on the user interface in one of the plurality of images based on a second anchor, the second anchor and the second object being generated by a device interacting with the mixed reality content.

9. A system comprising at least one processor and at least one memory including computer program code, the at least one memory and the computer program code configured to, with the at least one processor, cause the system:

insert a plurality of images representing a real-world location to a user interface associated with an application configured to generate mixed reality content operating on a first device;

associate an anchor with an image of the plurality of images, the anchor is derived from a data structure including geospatial data defining a position in space independent of sensor data associated with a second device that is in the real-world location, the data structure including a plurality of tiles representing the plurality of images, the plurality of tiles are tiered and include multiple resolutions, and the anchor is in a fixed position within the plurality of tiles and independent of the sensor data associated with the second device; and associate an object with the anchor, the anchor defining an origin for the object.

10. The system of claim 9, wherein the computer program code is further configured to cause the system to:

prior to inserting the plurality of images:

associate an interface with the application, the interface configured to associate the application with geolocation data;

search for the real-world location within the geolocation data using the interface; and in response to the searching for the real-world location, receiving at least one of an identification associated with the real-world location and an identification associated with the plurality of images.

11. The system of claim 9, wherein the computer program code is further configured to cause the system to:

prior to associating the anchor:

associating an interface with the application, the interface configured to associate the application with a geolocation anchor service;

identifying a location within the real-world location to place the anchor; and identifying the image of the plurality of images based on the location.

12. The system of claim 11, wherein the computer program code is further configured to cause the system to generate a data structure representing the anchor, the data structure including at least one of a identification of the location, an identification of a tile, a type of anchor, and an identification of the object.

13. The system of claim 9, wherein the anchor is a persistent anchor and the persistent anchor is associated with a geolocation.

14. The system of claim 9, wherein the anchor is one of a first anchor corresponding to a latitude, longitude, and altitude of a geolocation, a second anchor corresponding to a terrain at the geolocation, or a third anchor corresponding to an elevation at the geolocation.

15. The system of claim 9, wherein the computer program code is further configured to cause the system to:

generate the mixed reality content based on the anchor and the object; and stream the mixed reality content.

16. The system of claim 9, wherein the anchor is a first anchor and the object is a first object, the computer program code is further configured to cause the system to:

displaying a second object on the user interface in one of the plurality of images based on a second anchor, the second anchor and the second object being generated by a device interacting with the mixed reality content.

17. A non-transitory computer-readable storage medium comprising instructions stored thereon that, when executed by at least one processor, are configured to cause a computing system to:

associate a first interface with an application configured to generate mixed reality content, the first interface is operating on a first device and is configured to associate the application with geolocation data;

associate a second interface with the application, the second interface is configured to associate the application with a geolocation anchor service;

search for a real-world location within the geolocation data using the first interface;

insert a plurality of images representing the real-world location to a user interface associated with the application;

identify an image of the plurality of images as a location of interest;

associate an anchor with the image, the anchor is derived from a data structure including geospatial data defining a position in space independent of sensor data associated with a second device that is in the real-world location, the data structure including a plurality of tiles representing the plurality of images, the plurality of tiles are tiered and include multiple resolutions, and the anchor is in a fixed position within the plurality of tiles and independent of the sensor data associated with the second device; and associate an object with the anchor, the anchor defining an origin for the object.

18. The non-transitory computer-readable storage medium of claim 17, further comprising:

in response to the searching for the real-world location, receiving at least one of an identification associated with the real-world location and an identification associated with the plurality of images.

19. The non-transitory computer-readable storage medium of claim 17, wherein the anchor is a first anchor and the object is a first object, the instructions further cause the computing system to:

displaying a second object on the user interface in one of the plurality of images based on a second anchor, the second anchor and the second object being generated by a device interacting with the mixed reality content.

20. The non-transitory computer-readable storage medium of claim 17, wherein the anchor is a persistent anchor, and the persistent anchor is associated with a geolocation.

* * * * *